(No Model.) 4 Sheets—Sheet 2.
W. KÖHLER.
TORSION PENDULUM CLOCK.
No. 554,700. Patented Feb. 18, 1896.
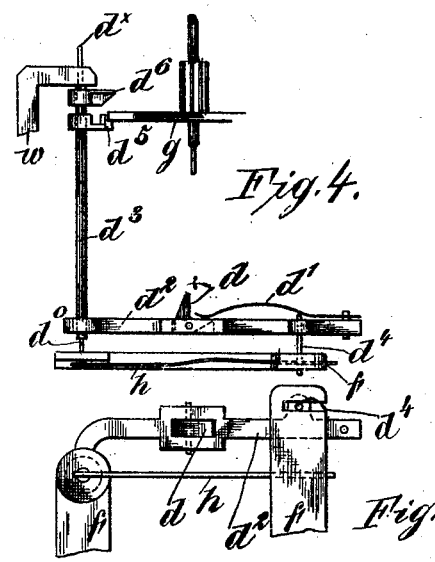
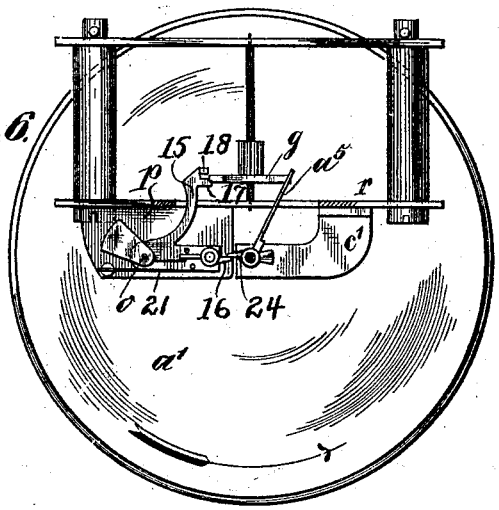
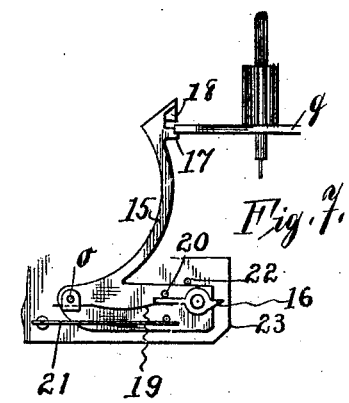
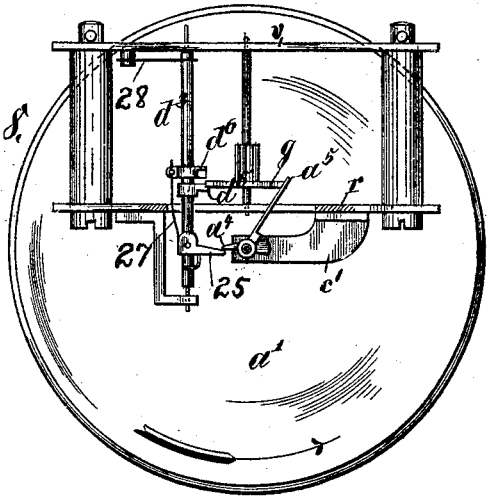
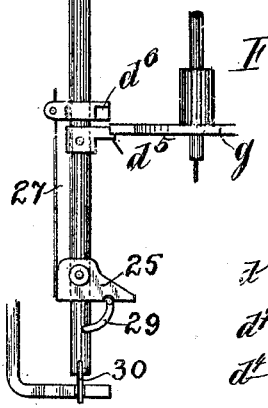
Witnesses:
W. C. Pinckney
L. Holloway
Inventor:
Wilhelm Köhler
By J. E. W. Dorer
Attorney

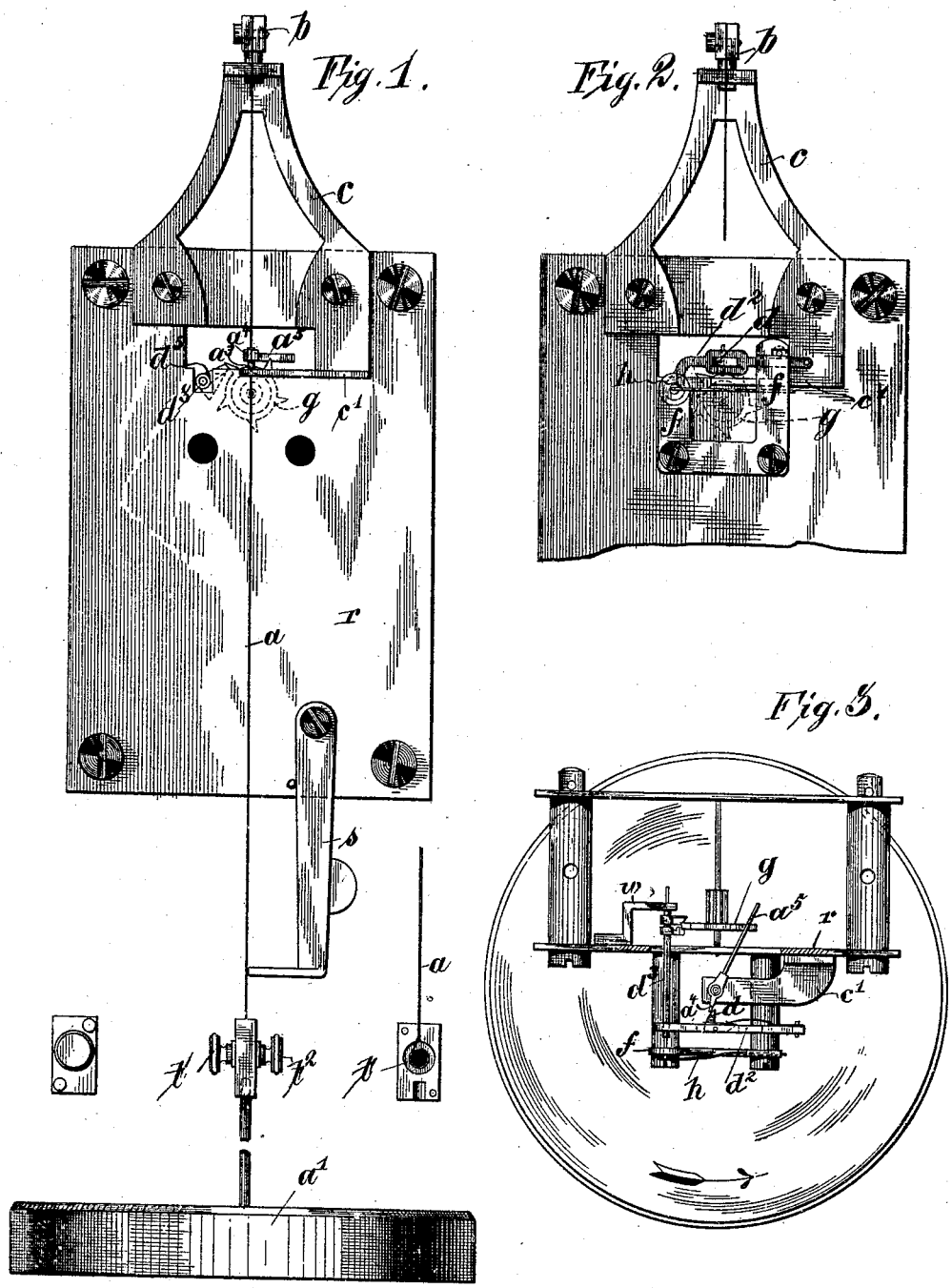

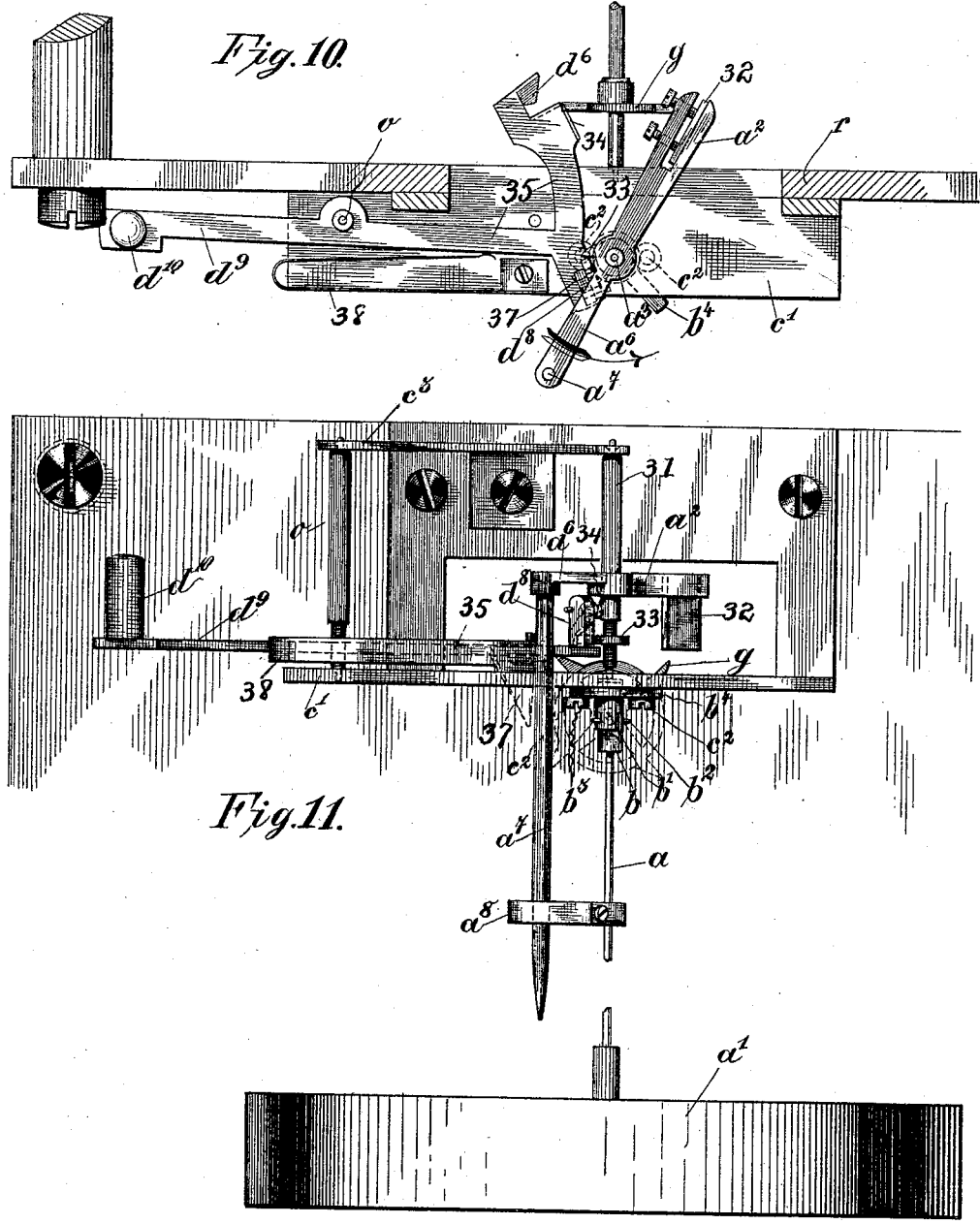

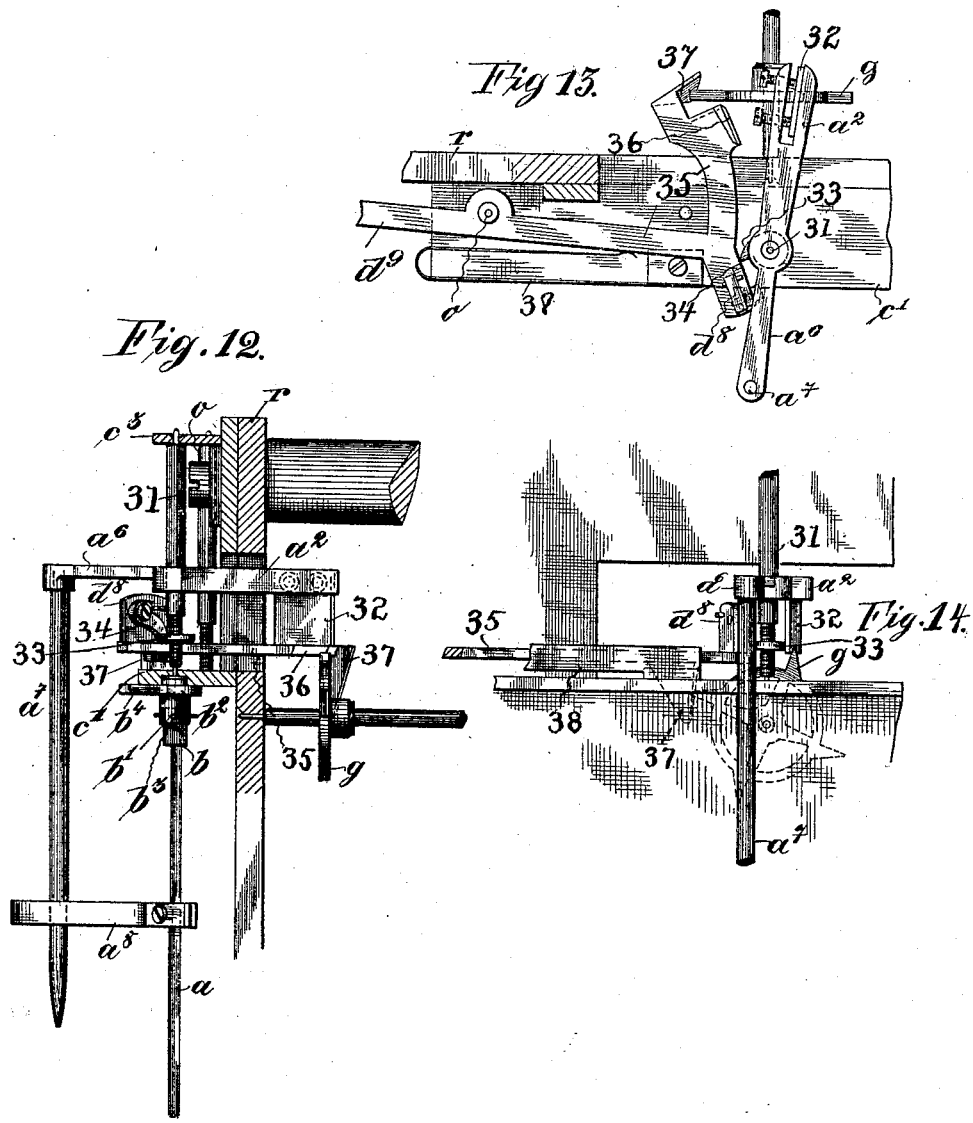

UNITED STATES PATENT OFFICE.

WILHELM KÖHLER, OF FÜRTH, GERMANY.

TORSION PENDULUM CLOCK.

SPECIFICATION forming part of Letters Patent No. 554,700, dated February 18, 1896.

Application filed June 22, 1895. Serial No. 553,647. (No model.) Patented in Germany July 6, 1890, No. 57,492.

*To all whom it may concern:*

Be it known that I, WILHELM KÖHLER, a subject of the King of Bavaria, residing at Fürth, near Nuremberg, Germany, have invented certain new and useful Improvements in Escapements for Horizontally-Oscillating Pendulums, (for which Letters Patent were granted me in Germany July 6, 1890, No. 57,492,) of which the following is a specification.

The present invention consists of an escapement for horizontally-oscillating pendulums, in which the torsion-spring of the pendulum is connected to a releasing-pawl and an impulse-arm, so as to cause the pendulum, when oscillating in one direction only by means of the releasing-pawl, to first remove the locking-pallet from the escapement-wheel, whereupon the next following tooth of the latter strikes the impulse-arm operating the pendulum, while the locking-pallet, having in the meantime returned to its former position, arrests the tooth of the escapement-wheel which has just left the impulse-arm; and in order to make the present specification more easily intelligible reference is had to the accompanying drawings.

Figure 1 is a rear elevation of the escapement, some of the parts having been omitted for the sake of greater clearness, Fig. 2 showing the upper part of Fig. 1, drawn to a larger scale; Fig. 3, a plan of Fig. 1, partly in section; Figs. 4 and 5, plan and rear elevation of details drawn to a larger scale. Fig. 6 shows a plan of a modification of the invention; Fig. 7, details of Fig. 6, drawn to a larger scale; Fig. 8, a plan of a further modification; Fig. 9, details of Fig. 8, drawn to a larger scale; and Figs. 10, 11, and 12 are respectively plan, rear, and side elevations, the latter seen from right to left, of a further modification of the invention, the escapement-wheel being represented with one tooth resting on the locking-pallet. Figs. 13 and 14 are plan and rear elevation of the device shown in Figs. 10, 11, and 12, showing the parts in position immediately after the locking-pallet has been removed from under the tooth of the escapement-wheel and when the impulse-arm is receiving its impetus from the next tooth of the escapement-wheel.

Referring to Figs. 1 to 5, $a$ is the torsion-spring carrying the pendulum $a'$ at its lower end, the upper end of said spring being clamped in a block $b$, supported in a bearing $c$ attached to the rear plate of the clockwork. The bearing $c$ carries at its lower part a horizontal plate $c'$, having suitable aperture through which the spring of the pendulum passes. The latter is provided with a short cylindrical sleeve $a^3$ at this point, extending through the aperture of the plate $c'$ and insuring the proper position of the spring. The upper end of the sleeve $a^3$ is provided with a horizontal impulse-arm $a^5$, Fig. 3, extending through a slot of the rear plate $r$ of the clockwork in proximity to the escapement-wheel $g$, and further with a releasing-pawl $a^4$. When the pendulum oscillates, the pawl $a^4$ strikes the spring-pawl $d$, which only moves freely in one direction (that of the arrow of Fig. 4) and is returned to its normal position by means of a spring $d'$.

When the pendulum oscillates in the direction of the arrow in Fig. 3 the pawl $a^4$ strikes the spring-pawl $d$, which cannot move freely at this oscillation of the pendulum, pushing the same backward (in Fig. 3 downward) and with it the lever $d^2$, in which the said spring-pawl is pivotally mounted. The left end, Fig. 4, of the lever $d^2$ is fast on a spindle $d^3$, the right-hand end being guided by means of a pin $d^4$ in a slot of a plate $f$, connected by suitable posts with the rear plate of the clockwork. One pivot $d^9$ of the spindle $d^3$ is mounted in the plate $f$, the opposite pivot $d^\times$ being supported in the free end of a bracket $w$ attached inside the rear plate $r$ of the clockwork. The spindle $d^3$ is adapted to slide in its bearings in the direction of its axis, and consequently moves rearwardly when the arm $d^2$ moves in this direction actuated by the pawl $a^4$ and the spring-pawl $d$. At this movement of the spindle $d^3$ the locking-pallet $d^5$, fast on the said spindle, is withdrawn from under the tooth of the escapement-wheel $g$, allowing the latter to rotate. Immediately after this movement the pawl $a^4$ slides off the spring-pawl $d$. Just before this movement the impulse-arm $a^5$, Fig. 3, is turned into the path of the escapement-wheel teeth, caught up by the next following tooth and turned on its axis, thus imparting motion to the pendulum owing to its rigid connection with the spring of the same.

While the scape-wheel engages the impulse-arm the spring-pawl $d$, lever $d^2$, spindle $d^3$, and locking-pallet $d^5$ are returned to their initial positions by means of the spring $h$, Figs. 4 and 5, pressing against the end of the pivot $d^0$, said spring being attached to the plate $f$.

As the impulse-arm $a^5$ turns in a horizontal plane and the tooth of the scape-wheel in a vertical one, these two parts will disengage at a certain point of their rotation, the pallet being freed from the scape-wheel. The latter will, however, be immediately arrested by the locking-pallet $d^5$, which has, as above mentioned, returned to its initial position, while the pendulum will continue to swing a short distance in the same direction. On the reverse swing of the pendulum the pawl $a^4$ turns the spring-pawl on its pivot and slides off the same without, however, communicating motion to the arm $d^2$, the spindle $d^3$ and the pallet $d^5$. When the swing of the pendulum is again reversed the operation just described is repeated.

In order to prevent an unintentional withdrawal of the locking-pallet $d^5$ from the scape-wheel, and the consequent running down of the clockwork, which might arise from an unusual concussion or jolting of the work, a second or safety locking-pallet $d^6$ is keyed to the spindle $d^3$, said locking-pallet being provided with an inclined surface and being situated somewhat lower than the locking-pallet $d^5$. The tooth of the scape-wheel last freed from the locking-pallet $d^5$ slides along this inclined surface, pushing back the spindle $d^3$ to its initial position.

The safety-pallet is advantageously mounted in a position to keep its contacting surface ordinarily out of contact with the teeth of the scape-wheel. If desired, however, the spring $h$ may be omitted and the spindle $d^3$ returned to its initial position by means of the inclined or cam surface of the safety locking-pallet $d^6$ alone, or both devices may be arranged to co-operate to attain the required result.

In the modification shown in Figs. 6 and 7 the spindle $d^3$ is replaced by an angle-lever 15, pivoted at $o$ to a bracket $p$ attached to the rear frame-plate $r$. The spring-pawl 16 is mounted in the outer arm of the angle-lever, as may be clearly seen at Fig. 7, the locking-pallets 17 and 18 being mounted on the inner arm of the said angle-lever. 19 is a spring acting to press the spring-pawl 16 against a pin 20 of the angle-lever. 21 is a spring operating to return the angle-lever to its initial position against a pin 22 of the bracket 23 after the said angle-lever 15 has been turned outwardly by and released from the pawl 24. The operation of this form of the invention, as also of the modification shown in Figs. 8 and 9, is similar to that of the device previously described.

The escapement shown in Figs. 8 and 9 differs from that of Figs. 3 and 4 merely in that the spring-pawl 25 is mounted directly on the spindle 26 and that the lever $d^2$ is omitted altogether. 27 is the spring to operate the spring-pawl, returning it to its initial position, and 28 is the spring which returns the spindle 26, which latter is in this case prolonged to the front plate of the work, the said spring 28 being attached to the front plate $v$. The movement of the spring-pawl 25 is limited at one side by the pin 29, and a rotary movement of the spindle is prevented by means of a lateral guide-pin 30 fixed to the end of said spindle and taking into its supporting-plate.

In connection with the device shown in Fig. 1 it is advantageous to provide an arm $s$ pivotally attached to the lower part of the rear plate $r$ of the clockwork, said arm having its free end bent round at a right angle and formed to a point which shall indicate the proper position of the pendulum-spring with regard to the work. The pendulum-spring must pass close by this point when the pendulum hangs properly in order to prevent friction of the sleeve $a^3$ against the sides of the aperture of the plate $c'$. It is of particular importance that no friction should occur at this point, because otherwise the aperture of the plate $c'$ will be worn away and become larger and the pawl will not engage the tumbler at the proper time. It is, however, absolutely necessary that the pawl push the locking-pallet out far enough to enable the tooth of the scape-wheel to slide or rather disengage from the said locking-pallet, which can only be accomplished when the pawl engages the spring-pawl exactly at the proper moment. In order to attain this object the pawl must be properly guided, so that the aperture cannot enlarge; otherwise the pawl will have an increasing play and will contact less and less with the spring-pawl, finally missing it altogether.

In the construction hitherto described this disadvantage—viz., the enlargement of the guide-hole of the plate $c'$—can only be avoided by keeping the pendulum-spring in a proper vertical position with regard to the works and by avoiding concussions, which is very difficult, and which is, in fact, impossible, so that the guide-hole, in spite of all precautions, will gradually enlarge. Such enlargement will have a further disadvantage in that the impulse-arm will not meet the teeth of the scape-wheel properly. Thus the leverage of the impulse-arm will vary, displacing the moment of operative power. Now in order to avoid these disadvantages the device illustrated in Figs. 10 to 14 has been constructed. According to this construction the sleeve carrying the pawl and the impulse-arm is detached from the pendulum-spring and connected to the same by means of suitable coupling, being retained in proper position with regard to the spring-pawl and the scape-wheel by means of suitable pivots, so that the clock will work evenly and exactly.

In Figs. 11 and 12 $a$ is the flat spring carrying at its lower end the pendulum $a'$, the upper end of the said spring being clamped between two plates $b$ riveted together. The clamp $b$ is mounted in the slot of a cylinder $b'$ and supported therein on a horizontal pin $b^2$, thus enabling the pendulum-spring to adjust itself properly vertically independently of the position of the clockwork. The cylinder $b'$ is provided with a flange $b^3$ toward its upper end, said flange having a radial arm $b^4$. The flange is held in contact with the plate $c'$ by means of two screws $c^2$, screwed into the plate $c'$ of the rear plate $r$ of the clockwork from underneath. The cylinder $b'$ extends a short distance above the flange, entering a circular depression of the said plate $c'$. The screws $c^2$ are sufficiently loose to enable the adjustment of the cylinder $b'$ by means of its arm $b^4$ in any direction necessary for the proper adjustment of the pendulum.

Above the pendulum-spring the sleeve 31, which may also be a solid body and is provided with a pivot or pin at either end, is mounted between the plates $c'$ and $c^3$, the lower pivot running on a jewel held in the plate $c'$ by means of the cylinder $b'$. The sleeve is provided with a radially inwardly extending arm $a^2$, carrying the impulse-arm 32, which is adjustably and interchangeably mounted on said arm by means of screws. The arm $a^2$ is extended at the opposite side of the sleeve 31 at $a^6$, the free end of said extension carrying a dependent spindle $a^7$, the lower end of which engages a fork $a^8$, fast on the spring $a$. Thus the motion imparted to the impulse-arm by the scape-wheel is conveyed to the spring of the pendulum.

The pawl 33, Figs. 10 and 12, is mounted on the lower screw-threaded end of the sleeve 31, its position on said sleeve being adjustable. Instead, however, of operating a horizontal spring-pawl, as described with reference to Figs. 6 and 7, the pawl in this case operates a spring-pawl swinging in the vertical plane, said spring-pawl 34 being mounted on a vertical arm $d^8$ of the lever 35. This arrangement has the advantage that the spring-pawl will return to its initial position by gravity, so that no such spring as $d'$ in Fig. 7 will be necessary. The lever 35, carrying the spring-pawl 34, Fig. 10, and turning with its axis $o$, carries at its inner end the locking-pallet 36 and safety locking-pallet 37. The said lever 35 is prolonged at the opposite side of its pivot $o$ to an arm $d^9$ and provided with a counterbalance-weight $d^{10}$. Thus when the clockwork is in a proper vertical position no lateral pressure will be exercised on the pivot $o$ of the lever, so that the said lever cannot get clamped. The main advantage of the counterbalance device is noticeable when the clockwork is not quite properly hung. In this case if the lever 35 had no counterbalance-weight it would have a tendency to swing by gravity round its pivot and withdraw the locking-pallet from under the tooth of the scape-wheel. It is true that the lever 35 would be returned to its initial position by the safety locking-pallet immediately after it had released the scape-wheel. It would, however, immediately fall out again and again release the scape-wheel, thus rendering the operation of the clockwork irregular. The possibility of such irregularities is provided against by the counterbalance-arm $d^9$, which resists any tendency of the lever 35 to fall outwardly. The spring 37 is also provided in order to prevent the lever 35 from being thrown outwardly by jerks or concussion, said spring pressing against the outer end of the lever 35 and tending to hold the same in its inner position. In the present case this spring may be very light, as the counterbalance device relieves it of much of its duty.

The operation of the device described with reference to Figs. 10 to 12 is similar to that of the devices previously described. It may be briefly mentioned that when the pendulum oscillates in the direction of the arrow in Fig. 10 the pawl 33 will strike the vertical spring-pawl 34 and swing the lever 35 outward, withdrawing the locking-pallet 32 from the tooth of the scape-wheel. On the movement of the pendulum in the opposite direction the pawl will not turn the tumbler, but will raise and pass under the same.

In conclusion it should be stated that the spring $a$ should be adjustably connected to the pendulum $a'$, so that the length of the same may be varied if necessary. The device for effecting this (shown at the lower part of Fig. 1) consists of a small drum $t$, in the circumference of which the lower end of the pendulum-spring is fastened. The said drum is mounted between two plates screwed together, the axis of the drum being extended through said plates and carrying a button $t'$, by means of which the drum may be wound up. The opposite end of the axis is provided with a screw-thread and a nut $t^2$ for tightening up the drum in any desired position.

The present escapement has the following advantages over the escapements hitherto employed: It requires less power, because the scape-wheel operates the free end of a single-arm lever of the impulse-arm $a^5$, which is coupled to the pendulum-spring and swings directly above the vertical scape-wheel, so that the pressure of the operative tooth of the scape-wheel on the lever takes place in a horizontal direction and is transmitted to the pendulum-spring increased in direct proportion to the length of the operative lever. The pendulum receives motion once only in a full oscillation, so that the employment of an anchor is avoided, a locking-pallet only being necessary. Thus the work may be more easily regulated.

I claim as my invention—

1. In an escapement, the combination of a spring-carried pendulum having a releasing-pawl to operate the escapement-wheel locking-pallet, and an impulse-arm to be stricken directly by the ordinary radial teeth of the escapement-wheel, and a pawl connected movably with said locking-pallet and being operated only by the releasing-pawl once each full oscillation of the pendulum to release the escapement-wheel whereupon the latter imparts motion to the impulse-arm, and means to return the said locking-pallet to its initial position in engagement with the escapement-wheel without the aid of the impulse-arm, substantially as set forth.

2. The combination of a spring-carried pendulum and means for suspending same, a sleeve mounted vertically above said pendulum and having impulse-arm and pawl adjustable thereon, a lever-arm carrying the scape-wheel locking-pallet and spring-pawl means for coupling the said sleeve to the pendulum-spring and means for returning the locking-pallet to its initial position, substantially as described.

3. The combination of a spring-carried pendulum and means for suspending same, a sleeve mounted vertically above said pendulum, and having impulse-arm and pawl adjustable thereon, a lever-arm carrying the scape-wheel locking-pallet and spring-pawl and having at the opposite side of its pivot a counterbalance-arm and means for returning the locking-pallet to its initial position in the manner and for the purpose substantially as described.

4. The combination of a spring-carried pendulum and means for suspending same a sleeve mounted vertically above said pendulum, and having impulse-arm and pawl adjustable thereon a lever-arm carrying the spring-pawl, locking-pallet and safety locking-pallet a cam-surface to said safety locking-pallet to engage the tooth of the scape-wheel and means for coupling the said sleeve to the pendulum-spring substantially as described.

In testimony whereof I have signed my name to this specification in the presence of two subscribing witnesses.

WILHELM KÖHLER.

Witnesses:
 LEONH. WEISKOPF,
 FRITZ CUSE.